United States Patent
Ree et al.

(10) Patent No.: US 8,847,784 B2
(45) Date of Patent: Sep. 30, 2014

(54) SYSTEMS, METHODS, AND APPARATUSES FOR DETERMINING POWER USAGE WITH A METER

(75) Inventors: Bradley Richard Ree, Cumming, GA (US); John Christopher Boot, Sandy Springs, GA (US)

(73) Assignee: General Electric Company, Schenectady, NY (US)

( * ) Notice: Subject to any disclaimer, the term of this patent is extended or adjusted under 35 U.S.C. 154(b) by 753 days.

(21) Appl. No.: 13/044,261

(22) Filed: Mar. 9, 2011

(65) Prior Publication Data

US 2012/0229297 A1    Sep. 13, 2012

(51) Int. Cl.
*H04L 12/28* (2006.01)
*G01D 4/02* (2006.01)
*H04L 12/14* (2006.01)

(52) U.S. Cl.
CPC ........... *H04L 12/2827* (2013.01); *Y02B 90/246* (2013.01); *H04L 12/14* (2013.01); *Y04S 20/40* (2013.01); *G01D 4/02* (2013.01); *Y02B 90/245* (2013.01); *Y04S 20/42* (2013.01)
USPC ................................ 340/870.02; 379/127.03

(58) Field of Classification Search
CPC ..... G06Q 20/102; G06Q 30/04; G06Q 50/06; G06Q 30/0283; G06Q 30/02; G06Q 40/12; G06Q 20/20; G06Q 20/40; G06Q 30/0207; G06Q 30/0241; G06Q 30/0251; G06Q 30/0273; G06Q 30/0284; G06Q 30/06; Y02B 70/3266; Y02B 90/246; Y04S 20/242; Y04S 20/42
USPC ................................ 340/807.02; 379/127.03
See application file for complete search history.

(56) References Cited

U.S. PATENT DOCUMENTS

| | | | | |
|---|---|---|---|---|
| 5,572,438 | A * | 11/1996 | Ehlers et al. | 700/295 |
| 6,529,839 | B1 * | 3/2003 | Uggerud et al. | 702/61 |
| 6,667,967 | B1 * | 12/2003 | Anderson et al. | 370/351 |
| 7,254,497 | B2 * | 8/2007 | Downey et al. | 702/64 |
| 7,486,782 | B1 | 2/2009 | Roos | |
| 8,055,586 | B1 * | 11/2011 | Sirota et al. | 705/52 |
| 8,560,134 | B1 * | 10/2013 | Lee | 700/291 |
| 2008/0219239 | A1 | 9/2008 | Bell et al. | |
| 2009/0195349 | A1 * | 8/2009 | Frader-Thompson et al. | 340/3.1 |

OTHER PUBLICATIONS

Search Report issued in connection with EP Application No. 12158323.1, Jun. 6, 2012.

* cited by examiner

*Primary Examiner* — Daniel Wu
*Assistant Examiner* — John Bamert
(74) *Attorney, Agent, or Firm* — Sutherland Asbill & Brennan LLP

(57) ABSTRACT

Systems, methods, and apparatuses may be provided for determining power usage within a meter. The systems, methods, and apparatuses may include providing, for a utility meter, at least one communications interface for communicating with a home area network (HAN); receiving or transmitting, via the at least one communications interface of the utility meter, information having a source or destination associated with the home area network (HAN); determining, by the utility meter, that the information is attributable to activity chargeable to a customer associated with the home area network (HAN); and updating, by the utility meter, a customer usage amount based upon the determination that the information is attributable to the activity chargeable to the customer.

20 Claims, 4 Drawing Sheets

SYSTEMS, METHODS, AND APPARATUSES FOR DETERMINING POWER USAGE WITH A METER

FIELD OF THE INVENTION

Embodiments of the invention relate generally to utility meters, and more particularly, to systems, methods, and apparatuses for determining power usage within a meter.

BACKGROUND OF THE INVENTION

With a smart utility meter system, there may be a plurality of devices such as home network devices in communication with a utility meter. In a conventional system, the owner of the utility meter such as a utility company is responsible for covering the power consumption of radios utilized for communicating with network devices, including home network devices. As home network devices increase in popularity, there may be increased traffic being handled by radios of utility meters. This increased traffic may result in increased power consumption by the radios of utility meters. As such, the owner of the utility meter such as a utility company may be interested in charging back at least a portion of the power consumption of the radios to customers. Accordingly, there is an opportunity for systems, methods, and apparatuses for determining power usage within a meter.

BRIEF DESCRIPTION OF THE INVENTION

Some or all of the above needs and/or problems may be addressed by certain embodiments of the invention. Embodiments of the invention may include systems, methods, and apparatuses for determining power usage within a meter.

According to another embodiment of the invention, there is disclosed a utility meter apparatus. The utility meter apparatus may include at least one communications interface for communicating with a home area network (HAN); and at least one processor in communication with the at least one communications interface. The at least one processor may be configured to: receive or transmit, via the at least one communications interface, information having a source or destination associated with the home area network (HAN); determine that the information is attributable to activity chargeable to a customer associated with the home area network (HAN); and update a customer usage amount based upon the determination that the information is attributable to the activity chargeable to the customer.

According to another embodiment of the invention, there is disclosed a method. The method may include providing, for a utility meter, at least one communications interface for communicating with a home area network (HAN); receiving or transmitting, via the at least one communications interface of the utility meter, information having a source or destination associated with the home area network (HAN); determining, by the utility meter, that the information is attributable to activity chargeable to a customer associated with the home area network (HAN); and updating, by the utility meter, a customer usage amount based upon the determination that the information is attributable to the activity chargeable to the customer.

According to another embodiment of the invention, there is disclosed a system. The system may include a server computer; and a plurality of utility meters in communication with the server computer. Each utility meter may include: at least one respective communications interface for communicating with a respective home area network (HAN); and at least one processor in communication with the at least one communications interface wherein at least one processor may be configured to receive or transmit, via the at least one respective communications interface, respective information having a respective source or destination associated with the respective home area network (HAN); determine that the respective information is attributable to respective activity chargeable to a respective customer associated with the respective home area network (HAN); and update a respective customer usage amount based upon the determination that the respective information is attributable to the respective activity chargeable to the customer, wherein the customer usage amount is accessible by the server computer.

Additional systems, methods, apparatuses, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
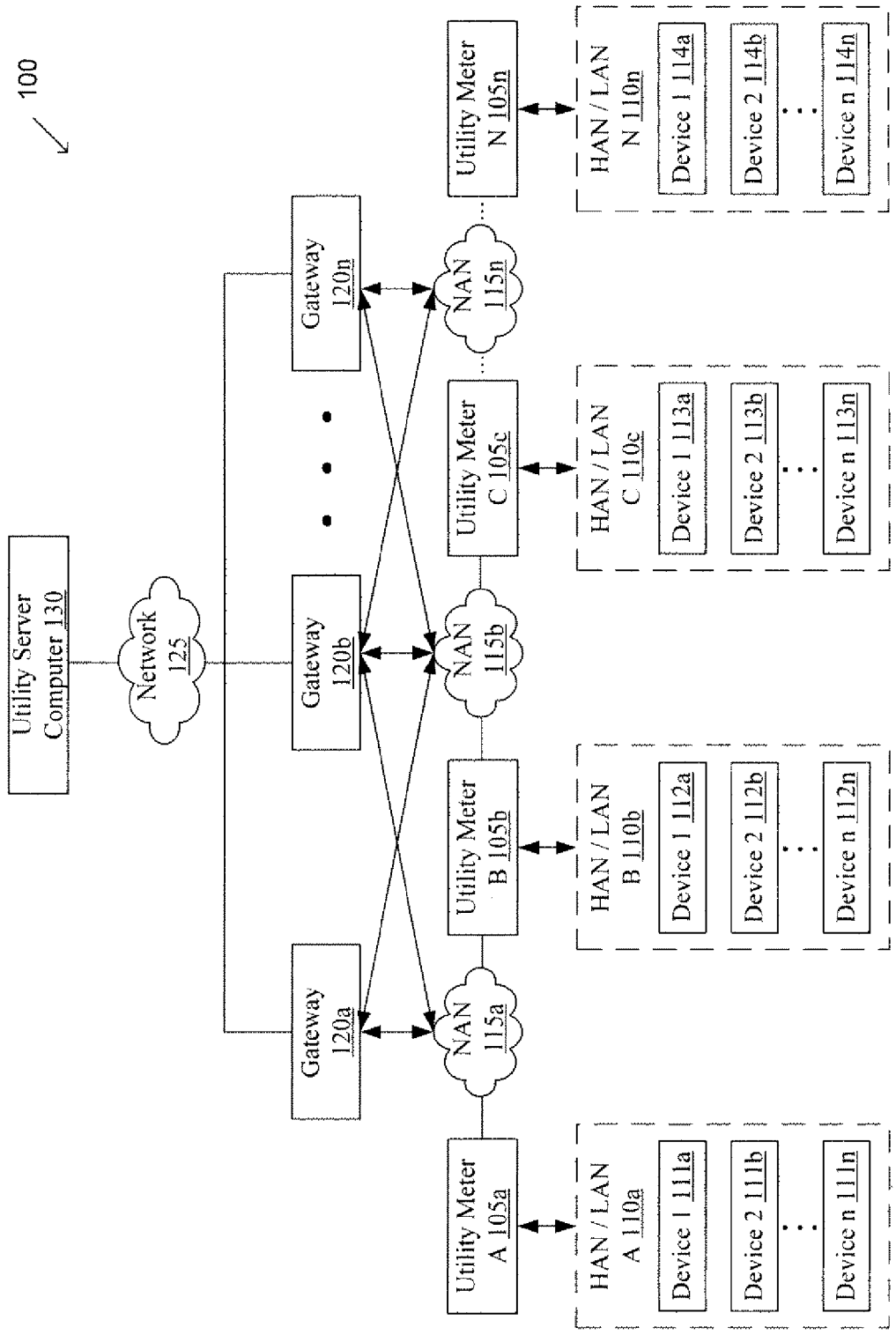

Having thus described the invention in general terms, reference will now be made to the accompanying drawings, which are not necessarily drawn to scale, and wherein:

FIG. 1 is a block diagram of one example utility metering system that supports determining power usage within a meter, according to an illustrative embodiment of the invention.

Figure 2:
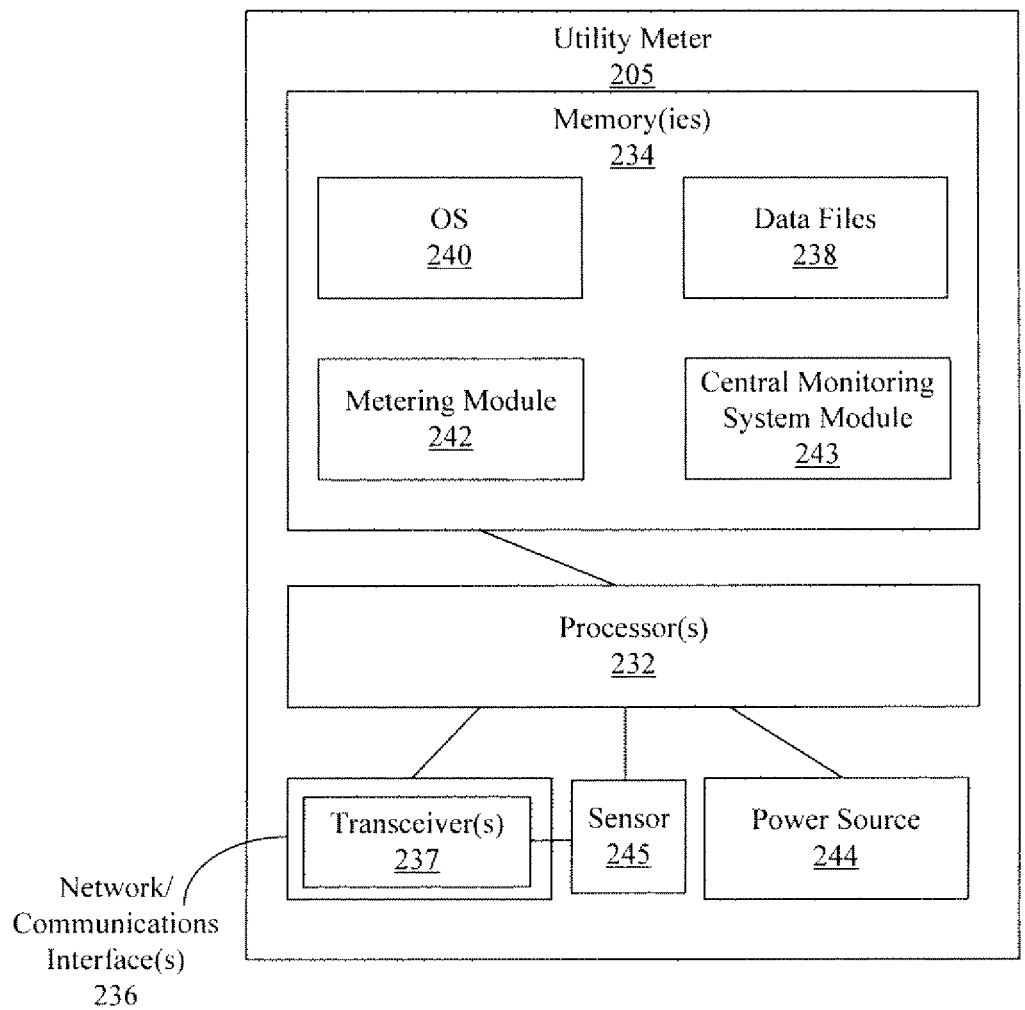

FIG. 2 illustrates an example utility meter, according to an example embodiment of the invention.

Figure 3:
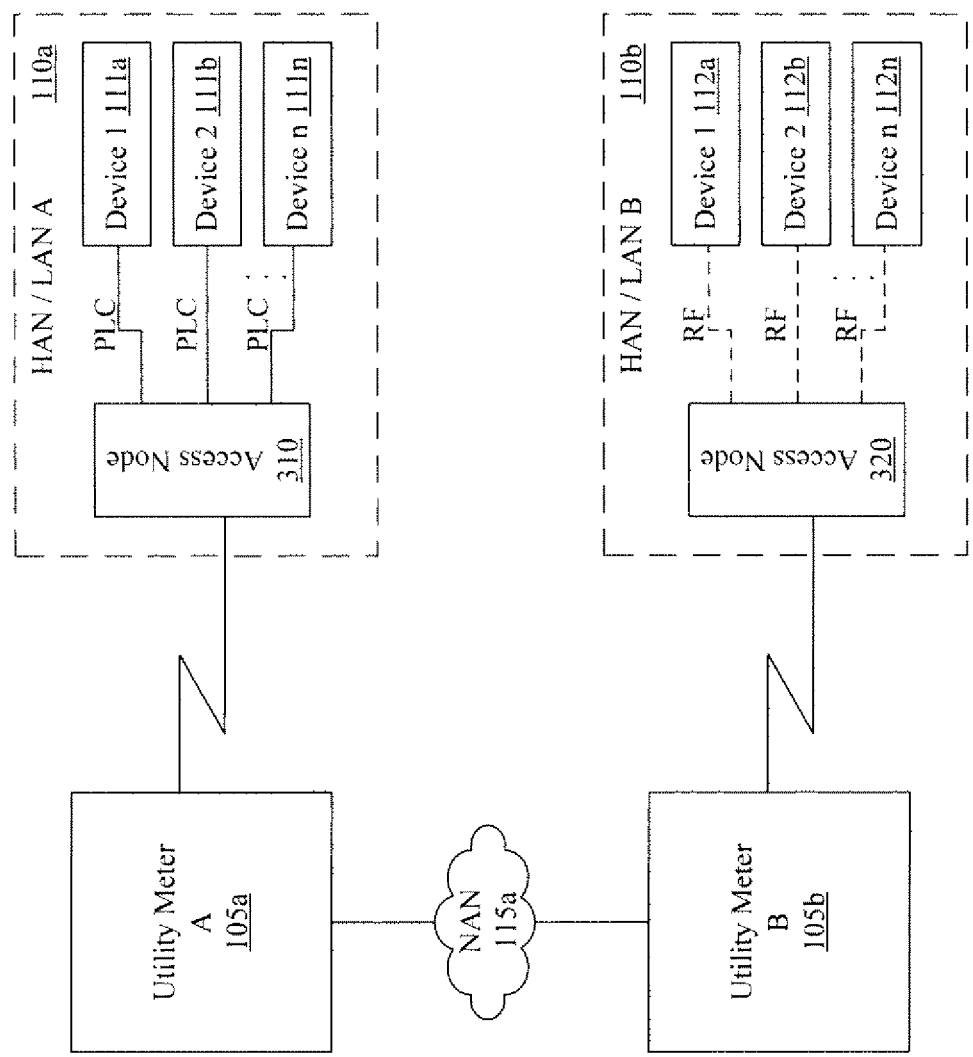

FIG. 3 illustrates an example implementation for HANs/LANs that are in communication with respective utility meters, according to an example embodiment of the invention.

Figure 4:
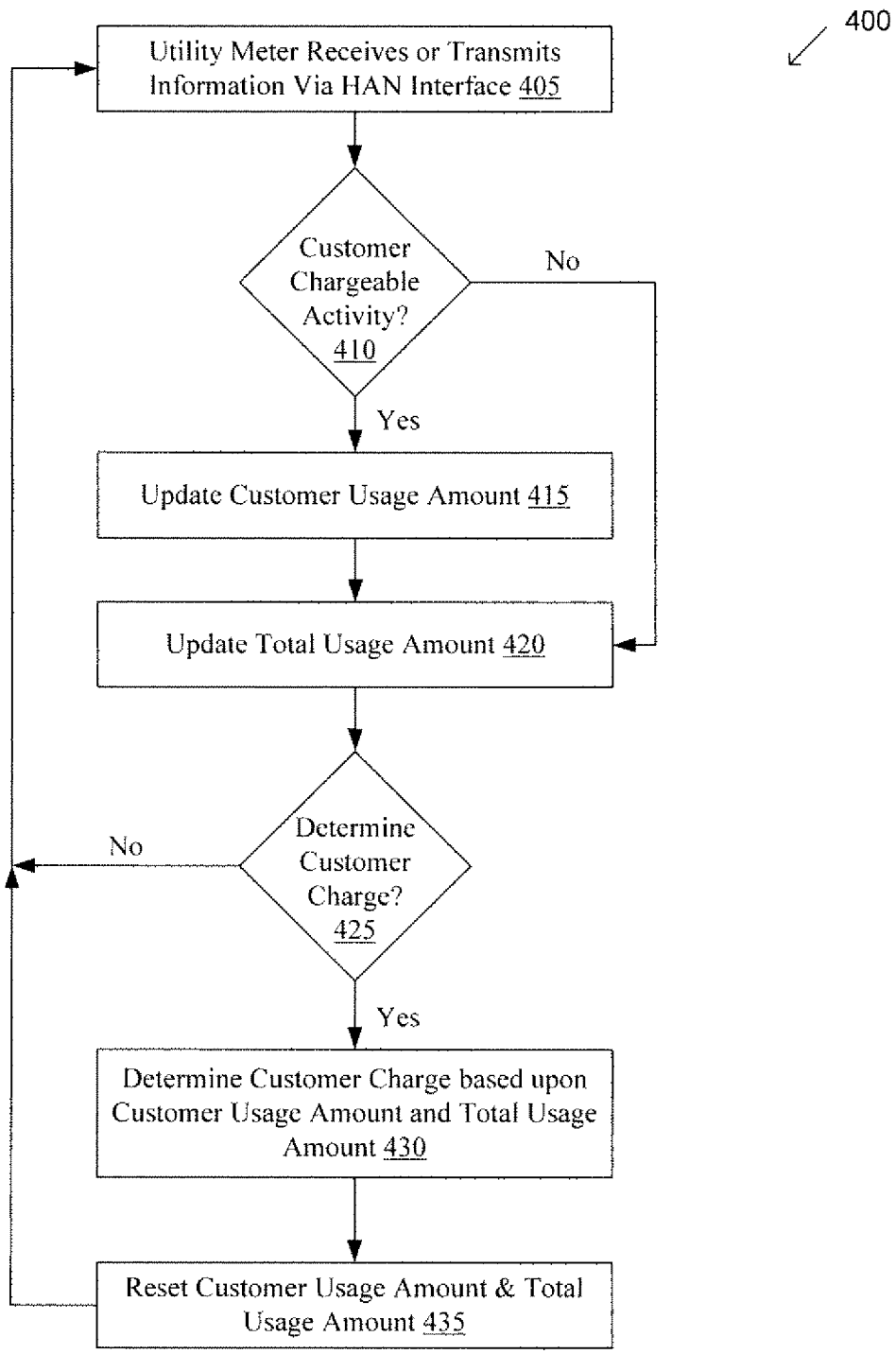

FIG. 4 illustrates an example flow diagram of a method for determining power usage within a utility meter, according to an example embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods, and apparatuses for determining power usage within a meter. In an example embodiment of the invention, a smart utility meter may be in communication with one or more network devices (e.g., home devices and other devices) via a home area network/local area network, as described herein. A smart utility meter in accordance with an example embodiment of the invention may determine whether information received from or destined to a network device is a result of activity chargeable to a customer. If the information received from or destined to a network device is a result of activity chargeable to a customer, then a customer usage amount may be updated to reflect power usage associated with receiving information from or transmitting information to a network device. If desired by a utility company or an owner of the utility meter, a customer may be charged for at least a portion of the customer usage amount, according to an example embodiment of the invention.

A smart utility meter in accordance with an example embodiment of the invention can analyze the information received from or destined to a network device to determine whether it is a result of activity chargeable to the customer. For example, the information can be analyzed to determine the message type or a unique identifier (e.g., Media Access Control (MAC) address, Internet Protocol (IP) address, or other network address etc.) associated with the source or destination of the information. Indeed, certain message types can be associated with activity chargeable to the customer. Alternatively, or additionally, information from or to certain network device addresses can also be associated with activity chargeable to the customer.

Various embodiments of the invention may include one or more special purpose computers, systems, and/or particular machines that facilitate the network communications with one or more smart utility meters and/or other network devices. A special purpose computer or particular machine may include a wide variety of different software modules as desired in various embodiments. As explained in greater detail below, in certain embodiments, these various software components may be utilized to facilitate communications between one or more network devices and one or more smart utility meters. Additionally, these various software components may be utilized to support determining power usage within a meter.

Certain embodiments of the invention described herein may have the technical effect of a utility meter determining power consumption by radios or other communications interfaces of the utility meter. For example, power consumption of radios or communications interfaces based upon activity chargeable to the customer may be determined and/or accumulated. In this way, power consumption by radios or communications interfaces can be allocated or apportioned based upon activity chargeable to the customer.

FIG. 1 is a block diagram of one example utility metering system 100 that supports determining power usage within a meter, according to an illustrative embodiment of the invention. The system 100 illustrated in FIG. 1 may include a plurality of smart utility meters 105*a-n*, according to an example embodiment of the invention. Each smart utility meter 105*a-n* may be in communication with one or more home area networks (HANs) or local area networks (LANs) 110*a-n* using wired communications (e.g., power line carrier communications, serial communications link, USB, Ethernet, fiber optic, etc.) or wireless communications (e.g., Zigbee, Global System for Mobile Communications (GSM), Wi-Fi, Worldwide Interoperability for Microwave Access (WiMAX), General Packet Radio Service (GPRS), Bluetooth, cellular, 3G, 4G, 802.11x, radio frequency (RF) mesh communications, etc.). Where a LAN is associated with one or more customer homes, the LAN may be referred to as a HAN. For convenience, the example HAN/LAN 110*a-n* described herein will be understood to encompass either or both a HAN or a LAN.

Each HAN/LAN 110*a-n* may include or be in communication with one or more network devices, which may include one or more home devices such as lights, appliances (e.g., refrigerator, stove, oven, dishwasher, clothes washer, clothes dryer, coffee maker, etc.), televisions, security systems, air conditioning and/or heating units, home Internet modems and routers, and the like, according to an example embodiment of the invention. For example, utility meter 105*a* can communicate with one or more network devices 111*a-n* via HAN/LAN 110*a*. Likewise, utility meter 105*b* can communicate with one or more network devices 112*a-n* via HAN/LAN 110*b*. Utility meter 105*c* can communicate with one or more network devices 113*a-n* via HAN/LAN 110*c*. Similarly, utility meter 105*n* can communicate with one or more network devices 114*a-n* via HAN/LAN 110*n*. It will be appreciated that one or more of the network devices 111*a-n*, 112*a-n*, 113*a-n*, 114*a-n* may receive a metered commodity (e.g., electricity, water, gas, etc.) via a respective utility meter 105*a-n*.

In addition, each smart utility meter 105*a-n* may be in further communication with one or more neighborhood area networks (NANs) 115*a-n* via wired or wireless communications similar to those described herein. These NANs 115*a-n* may provide further connectivity to other NANs and wide area networks (WANs) 125 (e.g., the Internet, a cellular network, a satellite-based network, etc.) via one or more gateway computers 120*a-n*. These NANs 115*a-n* and/or WANs 125 can enable communications between or among utility meters 105*a-n*, utility server computers 130, and/or one or more other computers associated with a utility company. It will be appreciated that the NANs 115 and/or WAN 125 can be provided or accessed via wired and/or wireless communications, and collectively can create an interconnected network. For example, a utility meter 105*a-n* can communicate with a utility server computer 130 via a gateway computer 120*a-n* and/or WAN 125. It will be appreciated that in some example embodiments, the WAN 125, gateway computers 120*a-n*, and the NANs 115*a-n* may be part of a same network such as the Internet. In an example embodiment of the invention, the utility meter 105*a-n* may also be in communication with a WAN 125 or other networks without an intermediate NAN 115*a-n*.

Many different communication paths between network devices may be available via the various combinations of HANs/LANs 110*a-n*, NANs 115*a-n*, gateway computers 120*a-n*, and WAN 125. For example, utility server computer 130 or other computers/processors associated with the utility company or another entity may communicate with various utility meters 105*a-n* through direct or indirect routes involving various combinations of WAN 125, gateway computers 120*a-n*, and other utility meters 105*a-n*. For example, utility server computer 130 could communicate with utility meter 105*b*, HAN/LAN 110*b*, and/or any devices 112*a-n* associated with HAN/LAN 110*b* using any combination of WAN 125, gateway computers 120*a-n*, and any other utility meters 105*a*, 105*c*, and/or 105*n*. Accordingly, in some example embodiments of the invention, utility meters 105*a-n* and HANs/LANs 110*a-n* can communicate with other network devices in performing certain routing or retransmission functionality, according to an example embodiment of the invention.

A utility meter 105*a-n* may be any suitable utility meter that may be connected to a commodity metering and distribution system, such as an electrical meter connected to a power distribution grid that includes any number of power lines. A wide variety of suitable electrical meters may be utilized as desired in various embodiments, such as a single-phase meter or a three-phase meter. A utility meter 105*a-n* may be configured to measure an amount of electrical energy (e.g., kilowatt hours, etc.) or electrical power that is supplied to an associated location, residence, business, household, or machine. In an alternative embodiment of the invention, the utility meter 105 can also be associated with the metering and distribution of commodities other than electricity such as water, gas, and the like. Thus, the utility meter 105*a-n* may be configured to meter and supply or distribute commodities to an associated location, residence, business; household, or machine, including an associated network device 111*a-n*, 112*a-n*, 113*a-n*, 114*a-n*.

In certain embodiments, the utility meter 105*a-n* may be a smart meter or an advanced meter that is configured to identify commodity consumption in relatively greater detail than a conventional meter. For example, a smart utility meter 105*a-n* may facilitate real-time or near real-time readings, commodity outage notifications, and/or commodity quality monitoring. Additionally, as desired, a smart utility meter 105*a-n* may communicate measurements data, calculations, and/or other information to one or more recipients, such as a utility server computer 130 of a utility company or a smart meter data processing system. Furthermore, as described herein, a smart utility meter 105*a-n* may be configured to determine power usage when processing or communicating information with one or more devices 111*a-n*, 112*a-n*, 113*a-n*, or 114*a-n*, according to an example embodiment of the invention.

As desired, embodiments of the invention may include a system 100 with more or less than the components illustrated in FIG. 1. Additionally, certain components of the system 100 may be combined or omitted in various embodiments of the invention. The system 100 of FIG. 1 is provided by way of example only, as appreciated by those of ordinary skill in the art.

FIG. 2 illustrates an example utility meter 205, according to an example embodiment of the invention. The utility meter 205 of FIG. 2 may be an example implementation of any one of the utility meters 105*a-n* of FIG. 1. As shown in FIG. 2, an example utility meter 205 may include any number of suitable computer processing components that facilitate the operation of the utility meter and/or the provision of a utility service and/or commodity (e.g., electricity, water, gas, etc.) to a location, including a customer home location. Examples of suitable processing devices that may be incorporated into a utility meter 205 include, but are not limited to, application-specific circuits, microcontrollers, minicomputers, other computing devices, and the like. As such, a utility meter 205 may include any number of processors 232 that facilitate the execution of computer-readable instructions. By executing computer-readable instructions, the utility meter 205 may include or form a special purpose computer or particular machine that facilitates the provision of a utility service and/or the provision of a commodity to a location.

In addition to one or more processor(s) 232, the utility meter 205 may include one or more memory devices 234 and/or one or more network and/or communications interfaces 236. The one or more memory devices 234 or memories may include any suitable memory devices, for example, caches, read-only memory devices, random access memory devices, magnetic storage devices, etc. The one or more memory devices 234 may store data, executable instructions, and/or various program modules utilized by the utility meter 205, for example, data files 238, an operating system ("OS") 240, a metering module 242, and/or a central monitoring system module 243. The data files 238 may include, for example, stored data associated with the operation of a utility meter 205, stored data associated with measurements and/or readings taken by the utility meter 205, utility meter configuration information, stored requests, messages and/or alerts, and/or stored commodity management, usage, and/or distribution data. The data files 238 can further include information supporting determining power usage within a meter. For example, the data files 238 may include identification of message or information types that are known to be chargeable and/or non-chargeable (or attributable/non-attributable) to customers. Likewise, the data files 238 can also include unique identifiers or other identifiers (e.g., MAC address, IP address, or other network address) known to transmit or receive information or messages that are known to be chargeable and/or non-chargeable (or attributable/non-attributable) to customers. For example, the data files 238 can maintain a MAC address or IP address for home network devices that are known to transmit information or messages to a utility meter 205, or receive information from a utility meter 205, in performing an activity that is chargeable to a customer. In addition, the data files 238 can also store identification information for one or more services that are chargeable to a customer. Many other types of information can be stored in data files 238 without departing from example embodiments of the invention.

The OS 240 may include executable instructions and/or program modules that facilitate and/or control the general operation of the utility meter 205. For example, the OS 240 may facilitate the execution of other software programs and/or program modules by the processors 232. The central monitoring system module 243 may be configured to identify when communications are being performed with one or more home network devices in accordance with activity chargeable to a customer, and to determine, perhaps using a sensor 245, the associated power consumption associated with such communications (e.g., power consumption by a radio or network/communications interface 236).

The one or more network communications interfaces 236 associated with the utility meter 205 can include a HAN/LAN interface and a NAN interface. The LAN interface can be used for communicating or connecting with one or more HANs/LANs such as HANs/LANs 110*a-n* of FIG. 1, and the NAN interface can be used for communicating or connecting with one or more NANs such as NANs 115*a-n* of FIG. 1. In this regard, a utility meter 205 may receive data from and/or communicate data to other components of the system 100. The one or more network/communications interfaces 236, including the HAN/LAN interface and/or the NAN interface, can be implemented as one or more network cards, adaptors, or transceivers 237 for communicating over wired interfaces (e.g., power line carrier communications, serial communications link, USB, Ethernet, fiber optic, etc.) and/or wireless interfaces (e.g., ZigBee, GSM, Wi-Fi, WiMAX, Bluetooth, GRPS, cellular, 3G, 4G, 802.11x, RF mesh communications, etc.). It will be appreciated that the one or more network/communications interfaces 236 can also be utilized for communicating or connecting with one or more other network devices or networks, including WAN 125 of FIG. 1, without departing from example embodiments of the invention. In addition, one or more sensors 245 may be in communication with transceiver(s) 237/network/communications interface 236 (e.g., radios) for determining power consumption associated with communicating with a network device in accordance with activity chargeable to a customer.

The utility meter 205 may typically receive a commodity from a connected commodity line, grid and/or source, and likewise meter and distribute the commodity to an associated location, residence, business, household, or machine, including an associated network device 111*a-n*, 112*a-n*, 113*a-n*, 114*a-n*. Additionally, as desired in certain embodiments, the utility meter 205 may include any number of suitable power sources 244, which can include wired power supplies and solar power cells, as well as back-up power supplies such as one or more batteries, fuel cells, or one or more super capacitors.

FIG. 3 illustrates an example implementation for HANs/LANs that are in communication with respective utility meters, according to an example embodiment of the invention. As shown in FIG. 3, according to an example implementation, there may be utility meter A 105*a* in communication with HAN/LAN A 110*a*, as well as a utility meter B 105*b* in communication with HAN/LAN B 110*b*. The utility meter A 105*a* and the utility meter B 105*b* may be in communication with one or more NANs, including NAN 115*a* or, alternatively, other NANs 115*b-n* or WANs, according to an example embodiment of the invention.

In the example implementation of FIG. 3, one or more of network devices 111*a-n* in HAN/LAN A 110*a* may communicate with the utility meter A 105*a* via power line carrier (PLC) communications or other wired communications. In addition or in the alternative, there may be one or more access nodes 310 for facilitating or routing communications between the network devices 111*a-n* and the utility meter A 105*a*. If one or more access nodes 310 are utilized, the access nodes 310 may likewise communicate with the utility meter A 105*a* via PLC communications or other wired communications, although radio frequency (RF) or other wireless communications could equally be utilized. An access node 310 may be in the form of a repeater, gateway, aggregator, router, or one of the devices 111*a-n*, without departing from example embodiments of the invention.

On the other hand, in the example implementation of FIG. 3, one or more devices 112*a-n* in HAN/LAN B 110*b* may communicate with the utility meter B 105*b* via radio frequency (RF) or other wireless communications. In addition or in the alternative, there may be one or more access nodes 320 for facilitating or routing communications between the devices 112*a-n* and the utility meter B 105*b*. If one or more access nodes 320 are utilized, the access nodes 320 may likewise communicate with the utility meter A 105*a* via RF or other wireless communications, although PLC or wired communications could equally be utilized. An access node 320 may be in the form of a repeater, gateway, aggregator, router, or one of the devices 112*a-n*, without departing from example embodiments of the invention.

It will be appreciated that many variations of FIG. 3 are available. According to one variation, HANs/LANs 110*a*, 110*b* can utilize a combination of communications via wired and wireless communications. For example, for HAN/LAN A 110*a*, a first portion of devices 111*a-n* may communicate with access node 310-/utility meter A 105*a* via wired or PLC communications, while a second portion of devices 111*a-n* may communicate with access node 310/utility meter A 105*a* via RF or wireless communications. Accordingly, HANs/LANs 110*a*, 110*b* may be heterogeneous networks supporting device communications via various communications mediums and various communications protocols.

Accordingly, the example utility meters 105*a*, 105*b* may be in communication with one or more respective network devices 111*a-n* or 112*a-n*, which when located in, near, or around a customer home, can be referred to as a home device. These network devices 111*a-n*, 112*a-n* may include lights, appliances (e.g., refrigerator, stove, oven, dishwasher, clothes washer, clothes dryer, coffee maker, etc.), televisions, security systems, air conditioning and/or heating units, sprinkler systems, home Internet modems and routers. It will be appreciated that network devices 111*a-n* can also be located outside of a customer home or location, and can communicate with the example utility meter using wired or wireless communications without departing from example embodiments of the invention.

FIG. 4 illustrates an example flow diagram of a method for determining power usage within a utility meter, according to an example embodiment of the invention. In certain embodiments, the operations of the method 400 may be performed by a utility meter, such as the example utility meter 205 of FIG. 2. For example, the operations of the method 400 may be implemented as computer-executable instructions stored in memory 234 and executed by a processor 232. Because the example utility meter 205 of FIG. 2 is representative of any of the utility meters 105*a-n* of FIG. 1 (or FIG. 3), it will be appreciated that the operations of the method 400 of FIG. 4 can likewise be performed by any of the utility meters 105*a-n*, or other utility meters in accordance with embodiments of the invention. For illustrative purposes, the method 400 of FIG. 4 will be discussed as being performed by either the example utility meter 105*a* or the example utility meter 105*b*, where each utility meter 105*a*, 105*b* may include one or more components of the example utility meter 205 of FIG. 2.

Turning now to FIG. 4, at block 405, a utility meter 105*a*, 105*b* may receive or transmit a packet, frame, or other information via its respective network/communications interface 236 for respective HAN/LAN 110*a*, 110*b*, according to an example embodiment of the invention. The packet, frame, or other information may have a source or destination associated with a HAN/LAN 110*a*, 110*b*. Indeed, the packet, frame, or other information may be received from or transmitted to one or more respective network devices 111*a-n*, 112*a-n* (e.g., home devices) within HAN/LAN 110*a*, 110*b*.

Still referring to block 405, when the packet, frame, or other information is being transmitted or received by the respective utility meter 105*a*, 105*b* via the network/communications interface 236 for a HAN/LAN, a power consumption sensor 245 may be enabled or otherwise utilized to determine the power consumption of the associated network/communications interface 236 (e.g., radio) when transmitting or receiving the packet, frame, or other information. Instead of or in addition to a sensor 245, a timer could also be used to record or determine the amount of time utilized by the network/communications interface 236 (e.g., radio) during transmission or receipt of the packet, frame, or other information. It will be appreciated that block 405 may generally determine a consumption amount, whether in units of power, time, or otherwise, utilized by the network/communications interface 236 when communicating with respective network devices 111*a-n*, 112*a-n* (e.g., home devices) within HAN/LAN 110*a*, 110*b*.

Following block 405 is block 410. At block 410, a utility meter 105*a*, 105*b* may determine whether the packet, frame, or other information is attributable to activity chargeable to a customer associated with the HAN/LAN 110*a* or 110*b*. Example activity that may be chargeable to a customer may include:

- Communications between a network device (e.g., home device) in the HAN/LAN and another network device (e.g., home device) in the HAN/LAN. For example, a network device may communicate with another network device for purposes of configuration, coordination of operation, power management, and the like.
- Communications between a meter and network devices (e.g., home devices) such as appliances, displays, and load devices.
- Since a HAN/LAN may be a mesh network, any customer traffic that is repeated through the meter to another customer device.
- Activity of a HAN/LAN communications interface in a meter for packets destined for a network device (e.g., home device) in the HAN/LAN. For example, a HAN/LAN communications interface (e.g., HAN radio or PLC modem) of a meter may wake up from a stand-by state to determine where a packet or other information is destined for. Packets or other information that cause the HAN/LAN communications interface to wake up, but ultimately are not bound for the meter, may be charged to the customer.

A network device in the HAN/LAN requesting information from the utility meter, or transmitting information to the utility meter. For example, a network device may request optional updates or configuration information.

Any other activity type associated with a particular service or software application.

It will be appreciated that block 410 may determine whether the packet, frame, or other information is attributable to activity chargeable to the customer based at least in part on a unique address or network address, including the source address and/or destination address, included or associated with the packet, frame, or other information. For example, a packet, frame, or other information can be determined to be associated with a network device (e.g., home device) in the HAN/LAN communicating with another home device in the HAN/LAN based upon the source and destination addresses of the packet, frame, or other information being associated with network devices in a HAN/LAN, according to an example embodiment of the invention. Indeed, a respective list of network devices may be maintained by respective utility meters 105*a*, 105*b* for purposes of identifying respective network devices 111*a-n*, 112*a-n* in respective HANs/LANs 110*a*, 110*b*. In addition or as an alternative, a bit or other information can be included (or set to a particular value) in the packet, frame, or other information to designate activity chargeable to the customer or utility, according to an example embodiment of the invention.

If block 410 determines that the packet, frame, or other information is attributable to activity chargeable to a customer, then processing may proceed to block 415 so that the customer usage amount can be updated. At block 415, the current customer usage amount may be updated from a prior value to reflect the determined power consumption at block 405 when the associated network/communications interface 236 (e.g., radio) is in operation or is processing. For example, the current customer usage amount may be updated by adding the power consumption determined at block 405 to a prior value of the customer usage amount. As an example, the current customer usage amount may be stored in an appropriate unit of power measurement such as watts, watt-hours, and the like. As an alternative, the current customer usage amount may be reflective of a unit of time instead of a unit of power measurement. In this alternative, if a timer or clock is utilized at block 405, then the current customer usage amount may be updated at block 415 by adding the time consumption determined at block 405 to a prior time value of the customer usage amount.

Following block 415 is block 420. At block 420, the total usage amount may likewise be updated to reflect the power consumption determined at block 405. In general, the total usage amount may reflect the power consumed by the network/communications interface 236 (e.g., radio) when a utility meter 105*a*, 105*b* communicates with respective network devices 111*a-n*, 112*a-n* (e.g., home devices) within HAN/LAN 110*a*, 110*b*, irrespective of whether the activity is attributable or not attributable to customer-chargeable activity, according to an example embodiment of the invention. As an alternative, if a timer is utilized at block 405, then the total usage amount may be updated at block 420 by adding the time consumption determined at block 405 to a prior time value of the total usage amount. It will be appreciated that the maintenance of a customer usage amount at block 415 and the total usage amount at block 420, whether in units of power, time, or otherwise, may enable the costs for power usage by the network/communications interface 236 (e.g., radio) to be allocated to a customer in a pro-rata manner in accordance with customer-chargeable and non-customer-chargeable activity, according to an example embodiment of the invention.

On the other hand, block 410 could also determine that the packet, frame, or other information is not attributable to activity chargeable to a customer, and processing may proceed directly to block 420. In this case, the total usage amount may likewise be updated to reflect the power consumption (or alternatively, time consumption) determined at block 405. However, in this case, it will be appreciated that the total usage amount is updated at block 420 without updating the customer usage amount at block 415 since the activity requiring operating the network/communications interface 236 (e.g., radio) is not chargeable to a customer.

Following block 420 is block 425, where a determination may be made as to whether a customer charge should be determined for billing, invoicing, or other allocating. For example, block 425 may be invoked periodically (e.g., once every week, once every month, once every two months, etc.) or upon a request received by a utility meter 105*a*, 105*b* from a utility server computer 130. If no customer charge is to be determined based upon block 425, then processing may return to block 405, as described above, where the customer usage amount and/or total usage amount can continue to be updated. It will also be appreciated that a time or time range of the consumption may likewise be recorded, which may facilitate demand-based pricing or tiered pricing based upon the time of day, according to an example embodiment of the invention.

On the other hand, if it is determined that a customer should be charged, then at block 430 the utility meter 105*a*, 105*b* can facilitate the determination of the customer charge amount based upon the customer-chargeable activity. For example, the utility meter 105*a*, 105*b* can deliver the customer usage amount and the total usage amount to the utility server computer 130. The utility server computer 130 can then determine the customer charge amount. For example, the utility server computer 130 can calculate a total amount due by the customer based upon the customer usage amount alone. For example, if the customer usage amount is provided in a unit of power consumption, such as watts or watt-hours, then the customer usage amount can be combined (e.g., multiplied) with a cost per watt or watt-hour. Likewise, if time or time range information for consumption is available, demand-based pricing or tiered pricing (e.g., rate X for usage during period A, and rate Y for usage during period B) may be utilized to determine the customer charge amount. For example, recorded time information may be available for the customer usage amount, where the time information enables allocating the customer usage amount to one or more time periods during a day (e.g., certain ranges within a 24 hour period). Alternatively, the utility server computer 130 can also calculate a ratio of the customer usage amount and the total usage amount (e.g., a ratio based upon power consumption or time consumption). The calculated ratio can then be combined (e.g., multiplied) with an estimated/actual power usage amount or cost for operation of a respective network/communications interface 236 (e.g., radio) by a respective utility meter 105*a*, 105*b* to calculate a customer-chargeable power usage amount or chargeable monetary amount. If a chargeable power usage amount is determined, it can be combined or multiplied with a cost per power usage amount to derive a customer-chargeable monetary amount. It will be appreciated that these calculations being performed by the utility server computer 130 could also be performed by the utility meter 105*a*, 105*b*, with the results of the calculations being transmitted to the utility server computer 130, according to an example embodiment of the invention. Accordingly, the total chargeable amount due by the customer can then be recovered, for example, by billing the customer for the usage, or by adding the amount to the customer's bill from a utility company, according to an example embodiment of the invention.

Following block 430 is block 435. At block 435, the utility meter 105a, 105b can then reset the customer usage amount and the total usage amount so that the total amount due by the customer can be determined for another time period. Alternatively, block 435 may not necessarily need to reset the customer usage amount and the total usage amount if the prior values utilized for prior time periods are maintained, according to an example embodiment of the invention.

It will be appreciated that many variations of FIG. 4 are available without departing from example embodiments of the invention.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A utility meter provided by a utility provider to a customer, the utility meter comprising:
at least one communications interface for communicating with a home area network (HAN); and
at least one processor in communication with the at least one communications interface, wherein the at least one processor is configured to:
receive or transmit, via the at least one communications interface, one or more communications having a source or a destination associated with the home area network (HAN);
analyze the one or more communications to determine that information in the one or more communications is attributable to activity chargeable to the customer by the utility provider; and
update a customer power usage amount based upon the amount of power consumed by receiving or transmitting the one or more communications via the at least one communications interface.

2. The utility meter of claim 1, wherein the at least one processor is further configured to:
record time information associated with the customer power usage amount, wherein the time information enables allocating the customer power usage amount to one or more time periods.

3. The utility meter of claim 1, wherein the activity chargeable to the customer includes one or more of (i) one device in the home area network (HAN) communicating with another device in the home area network (HAN), or (ii) a device in the home area network (HAN) requesting information from the utility meter.

4. The utility meter of claim 1, wherein the information is determined to be attributable to activity chargeable to the customer based at least in part upon analysis of at least one additional bit that is used to designate activity chargeable to the customer.

5. The utility meter of claim 1, wherein the customer power usage amount is associated with an amount of power utilized by at least a radio or a transceiver in transmitting or receiving the one or more communications via the at least one communications interface.

6. The utility meter of claim 1, wherein the at least one processor is further configured to update a total power usage amount to reflect a non-customer power usage amount.

7. The utility meter of claim 6, wherein a monetary amount chargeable to the customer is based upon a comparison of the customer power usage amount and the total power usage amount.

8. The utility meter of claim 1, wherein the processor is further configured to:
receive or transmit, via the at least one communications interface, another one or more communications comprising information having a source or a destination associated with the home area network (HAN);
determine that the information in the another one or more communications is attributable to activity not chargeable to the customer; and
update a non-customer power usage amount based upon the determination that the information in the another one or more communications is attributable to activity not chargeable to the customer.

9. The utility meter of claim 8, wherein the at least one communications interface further enables communications with a neighborhood area network (NAN), wherein the activity not chargeable to the customer includes messages sent from the neighborhood area network (NAN) to one or more devices in the home area network (HAN).

10. The utility meter of claim 9, wherein the neighborhood area network (NAN) enables communications with the utility provider, and wherein the messages are sent by the utility provider.

11. The utility meter of claim 1, further comprising:
a sensor for measuring power consumption of at least a transceiver or radio utilized by the at least one communications interface when communicating with the home area network (HAN).

12. A method for using a utility meter provided by a utility provider to a customer, the method comprising:
receiving or transmitting, via at least one communications interface of the utility meter, one or more communications having a source or a destination associated with a home area network (HAN);
analyzing the one or more communications to determine that the information in the one or more communications is attributable to activity chargeable to the customer by the utility provider; and
updating a customer power usage amount based upon the amount of power consumed by receiving or transmitting the one or more communications via the at least one communications interface.

13. The method of claim 12, wherein the activity chargeable to the customer includes one or more of (i) one device in the home area network (HAN) communicating with another device in the home area network (HAN), or (ii) a device in the home area network (HAN) requesting information from the utility meter.

14. The method of claim 12, wherein the information is determined to be attributable to activity chargeable to the customer based at least in part upon a network address indicated in the information, the network address identifying one or more devices in the home area network (HAN).

15. The method of claim 12, wherein the customer power usage amount is associated with an amount of power utilized by at least a radio or a transceiver in transmitting or receiving the one or more communications via the at least one communications interface, and wherein the information is determined to be attributable to activity chargeable to the customer based at least in part upon analysis of at least one bit that is set to a predefined value to designate activity chargeable to the customer.

16. The method of claim 12, further comprising:
updating a total power usage amount to reflect a non-customer usage amount.

17. The method of claim 16, wherein a monetary amount chargeable to the customer is based upon a comparison of the customer power usage amount and the total power usage amount.

18. The method of claim 12, wherein the information is first information, and further comprising:
receiving or transmitting, via the at least one communications interface of the utility meter, another one or more communications comprising information having a source or destination associated with the home area network (HAN);
determining that the information in the another one or more communications is attributable to activity not chargeable to the customer; and
updating a non-customer power usage amount based upon the determination that the information in the another one or more communications is attributable to activity not chargeable to the customer.

19. The method of claim 12, further comprising:
providing, for the utility meter, a sensor for measuring power consumption of at least a transceiver or a radio utilized by the at least one communications interface when communicating with the home area network (HAN).

20. A system, comprising:
a server computer; and
a plurality of utility meters in communication with the server computer, wherein each utility meter includes:
at least one communications interface for communicating with a home area network (HAN); and
at least one processor in communication with the at least one communications interface, wherein the at least one processor is configured to:
receive or transmit, via the at least one communications interface, one or more communications having a source or a destination associated with the home area network (HAN);
analyze the one or more communications to determine that information in the one or more communications is attributable to activity chargeable to a customer associated with the home area network (HAN); and
update a customer power usage amount of the customer based upon the amount of power consumed by receiving or transmitting the one or more communications via the at least one communications interface, wherein the customer power usage amount is accessible by the server computer.

* * * * *